United States Patent
Ito

(10) Patent No.: US 7,078,078 B2
(45) Date of Patent: *Jul. 18, 2006

(54) OPTICAL COMPENSATORY SHEET COMPRISING TRANSPARENT SUPPORT AND OPTICALLY ANISOTROPIC LAYER

(75) Inventor: Yoji Ito, Kanagawa (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 103 days.

This patent is subject to a terminal disclaimer.

(21) Appl. No.: 10/052,440

(22) Filed: Jan. 23, 2002

(65) Prior Publication Data

US 2002/0145691 A1    Oct. 10, 2002

(30) Foreign Application Priority Data

Jan. 23, 2001    (JP)    ............................ 2001-014833

(51) Int. Cl.
*G02F 1/13363* (2006.01)

(52) U.S. Cl. ................. 428/1.1; 428/1.3; 428/1.55; 428/1.6; 349/117; 349/118; 252/299.62; 252/299.64; 106/171.1; 536/76

(58) Field of Classification Search ................ 428/1.2, 428/1.3, 1.33, 1.5, 1.54, 1.55, 1.6; 349/96, 349/117–119, 123; 252/299.01, 299.62, 252/299.64; 106/171.1; 536/69, 76
See application file for complete search history.

(56) References Cited

U.S. PATENT DOCUMENTS

| | | | |
|---|---|---|---|
| 5,631,051 A | | 5/1997 | Ito |
| 5,635,105 A | | 6/1997 | Kawata et al. |
| 5,641,426 A | * | 6/1997 | Nerad et al. ............ 252/299.01 |
| 5,663,310 A | * | 9/1997 | Shimoda et al. ............... 536/69 |
| 5,747,121 A | | 5/1998 | Okazaki et al. |
| 6,262,788 B1 | * | 7/2001 | Hanrahan et al. ............ 349/117 |
| 6,410,130 B1 | * | 6/2002 | Schuhmacher et al. ..... 428/327 |
| 6,476,892 B1 | * | 11/2002 | Aminaka ..................... 349/117 |
| 6,897,303 B1 | * | 5/2005 | Yamada ........................ 536/58 |

FOREIGN PATENT DOCUMENTS

JP    2000-235117 A    8/2000

OTHER PUBLICATIONS

Patent Abstracts of Japan Publication No. 2000-235117, dated Aug. 29, 2000, *Optical Compensation Sheet and Liquid Crystal Display Device*.

* cited by examiner

Primary Examiner—Harold Pyon
Assistant Examiner—Sow-Fun Hon
(74) Attorney, Agent, or Firm—Buchanan Ingersoll PC

(57) ABSTRACT

An optical compensatory sheet comprises a transparent support and an optically anisotropic layer. The optically anisotropic layer is formed from liquid crystal molecules and monomers having four or more double bonds. The monomers are polymerized to form a polymer in the optically anisotropic layer.

3 Claims, 2 Drawing Sheets

OPTICAL COMPENSATORY SHEET COMPRISING TRANSPARENT SUPPORT AND OPTICALLY ANISOTROPIC LAYER

FIELD OF THE INVENTION

The present invention relates to an optical compensatory sheet comprising a transparent support and an optically anisotropic layer formed from liquid crystal molecules. The invention also relates to a liquid crystal display having the optical compensatory sheet.

BACKGROUND OF THE INVENTION

A liquid crystal display comprises a liquid crystal cell and a polarizing plate. In a liquid crystal display of transmission type, two polarizing plates are placed on both sides of the liquid crystal cell. On the other hand, a liquid crystal display of reflection type comprises a reflection plate, a liquid crystal cell and one polarizing plate in this order.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecules. Various display modes are proposed according to alignment of the rod-like liquid crystal molecules in the cell. Examples of the display modes for transmission type include TN (twisted nematic) mode, IPS (in-plane switching) mode, FLC (ferroelectric liquid crystal) mode, OCB (optically compensatory bend) mode, STN (super twisted nematic) mode, ECB (electrically controlled birefringence) mode and VA (vertically aligned) mode. Examples of the modes for reflection type include TN mode and HAN (hybrid aligned nematic) mode.

A liquid crystal display usually comprises an optical compensatory sheet (phase retarder) as well as the liquid crystal cell and the polarizing plate. The optical compensatory sheet prevents the displayed image from undesirable coloring. The optical compensatory sheet has another function of enlarging a viewing angle of a liquid crystal cell. In a display of transmission type, one or two optical compensatory sheets are placed between the liquid crystal cell and the polarizing plate. In a display of reflection type, one optical compensatory sheet is placed between the liquid crystal cell and the polarizing plate.

A stretched birefringent polymer film has been conventionally used as the optical compensatory sheet.

An optical compensatory sheet comprising a transparent support and an optically anisotropic layer formed from liquid crystal molecules (particularly, discotic liquid crystal molecules) has recently been proposed in place of the stretched birefringent polymer film. The optically anisotropic layer is formed by aligning the liquid crystal molecules and fixing alignment of the molecules. The liquid crystal molecules inherently have large birefringence and various alignment forms. Therefore, an optical compensatory sheet obtained from the liquid crystal molecules has a specific optical characteristic that cannot be obtained from the conventional stretched birefringent polymer film.

The optical characteristic of the optical compensatory sheet is designed according to that of the liquid crystal cell, namely, according to display mode of the liquid crystal cell. If the optical compensatory sheet is made with liquid crystal molecules (particularly, discotic liquid crystal molecules), various optical characteristics can be designed according to the display mode of the liquid crystal cell.

Various optical compensatory sheets using discotic liquid crystal molecules have been proposed for liquid crystal cells of various display modes. For example, an optical compensatory sheet for liquid crystal cell of TN mode is described in Japanese Patent Provisional Publication No. 6(1994)-214116, U.S. Pat. Nos. 5,583,679, 5,646,703 and German Patent Publication No. 3,911,620A1. An optical compensatory sheet for liquid crystal cell of IPS or FLC mode is described in Japanese Patent Provisional Publication No. 10(1998)-54982. An optical compensatory sheet for OCB or HAN mode is described in U.S. Pat. No. 5,805,253 and International Patent Application No. WO96/37804. An optical compensatory sheet for STN mode is described in Japanese Patent Provisional Publication No. 9(1997)-26572. An optical compensatory sheet for VA mode is described in Japanese Patent No. 2,866,372.

In preparation of a liquid crystal display, the parts of the display such as the liquid crystal cell, the polarizing plate and the optical compensatory sheet are laminated in order with an adhesive. The optical directions (e.g., polarizing axis, slow axis) of the cell, the polarizing plate and the compensatory sheet must be strictly adjusted according to the displaying mode of the cell. It is, however, impossible to avoid producing some failed displays in which the optical directions of the laminated parts are improperly arranged. The parts in such display are preferably delaminated to reuse them.

The optical compensatory sheet is often destroyed while the sheet is peeled from the liquid crystal cell. The destroyed sheet cannot be reused. Further, the fragments of the sheet remaining on the liquid crystal cell must be removed to reuse the cell.

Accordingly, it has been wanted to improve the mechanical strength of the optical compensatory sheet without affecting its optical characters.

Japanese Patent Provisional Publication No. 8(1996)-27284 discloses a strong optical compensatory sheet. In preparation of the sheet, discotic liquid crystal molecules having polymerizable groups are aligned, and polymerized to improve the mechanical strength of the sheet.

Japanese Patent Provisional Publication No. 9(1997)-152509 discloses another strong optical compensatory sheet. In preparation of the sheet, polymerizable groups are introduced into not only discotic liquid crystal molecules but also a polymer of an orientation layer provided between a transparent support and an optically anisotropic layer. Accordingly, the polymer and the discotic liquid crystal molecules are co-polymerized along an interface between the orientation layer and the optically anisotropic layer.

Japanese Patent Provisional Publication No. 2000-235117 discloses an optical compensatory sheet in which a transparent support and an optically anisotropic layer are combined with a peel strength of 400 g/cm or more. Inorganic fine particles are added into the transparent support, the orientation layer or the optically anisotropic layer to improve the peel strength.

SUMMARY OF THE INVENTION

A mechanically strong optical compensatory sheet can be prepared according to the descriptions of Japanese Patent Provisional Publication Nos. 8(1996)-27284, 9(1997)-152509 and 2000-235117.

However, the applicant has found that the improved optical compensatory sheet still sometimes breaks, and partially remains on the substrate of the cell when the sheet is peeled from the liquid crystal cell. The trouble occurs once per 10 to 100 times. Accordingly, the mechanical strength of the compensatory sheet should be further improved to reuse the optical compensatory sheet peeled from the liquid crystal cell.

An object of the present invention is to provide an optical compensatory sheet further improved in mechanical strength.

Another object of the invention is to provide an optical compensatory sheet can be reused even if the sheet is improperly laminated in preparation of a liquid crystal display.

The present invention provides an optical compensatory sheet comprising a transparent support and an optically anisotropic layer, wherein the optically anisotropic layer is formed from liquid crystal molecules and monomers having four or more double bonds, said monomers being polymerized to form a cross-linked polymer in the optically anisotropic layer.

The invention also provides a liquid crystal display comprising two polarizing plates, a liquid crystal cell provided between the plates, and at least one optical compensatory sheet placed between the cell and at least one of the plates, said optical compensatory sheet comprising a transparent support and an optically anisotropic layer, wherein the optically anisotropic layer formed from liquid crystal molecules and monomers having four or more double bonds, said monomers being polymerized to form a polymer in the optically anisotropic layer.

The applicant has noted that the number of double bonds (which function as polymerizable groups) should be increased in the optically anisotropic layer to improve the mechanical strength of the compensatory sheet.

The method disclosed in Japanese Patent Provisional Publication No. 8(1996)-27284, in which polymerizable groups are introduced into liquid crystal molecules in the optically anisotropic layer, is very effective in improving the mechanical strength. However, only a limited number of the polymerizable groups can be introduced because the structure and the amount of the liquid crystal molecules must be determined in consideration of optical characters, which is the most important factor of liquid crystal. Therefore, the amount of the polymerizable groups cannot be determined only in consideration of the mechanical strength.

The method disclosed in Japanese Patent Provisional Publication No. 9(1997)-152509, in which polymerizable groups are introduced into a polymer of an orientation layer, is effective in reinforcing only the interface between the orientation layer and the optically anisotropic layer. Accordingly, the polymerizable groups of the polymer cannot improve the mechanical strength of the optically anisotropic layer itself. In the case where the optically anisotropic layer is relatively thick (for example, the thickness is 1.5 µm or more), the mechanical strength of the layer should be improved by another method.

The inorganic fine particles disclosed in Japanese Patent Provisional Publication No. 2000-235117 also effectively improve the mechanical strength of optical compensatory sheet. However, the amount of the inorganic fine particles must be so controlled that particles may not affect the functions of the optically anisotropic layer and the orientation layer.

The applicant has further studied mechanical strength of an optical compensatory sheet, and succeeded in producing a sheet remarkably improved in mechanical strength. In preparation of the optical compensatory sheet, multifunctional monomers having four or more double bonds are added into the optically anisotropic layer, and then polymerized. The multi-functional monomers can remarkably increase the number of double bonds (which serve as polymerizable functional groups) in the optically anisotropic layer without affecting the optical function of the layer.

Where the number of double bonds is increased in the optically anisotropic layer, polymerization reaction in the layer can prepare an optical compensatory sheet remarkably improved in mechanical strength. If the prepared optical compensatory sheet of the invention is laminated onto a liquid crystal cell, and then peeled off, the sheet hardly breaks, and scarcely remains on the substrate of the cell.

DETAILED DESCRIPTION OF THE INVENTION

[Basic Structure of Liquid Crystal Display]

Figure 1:
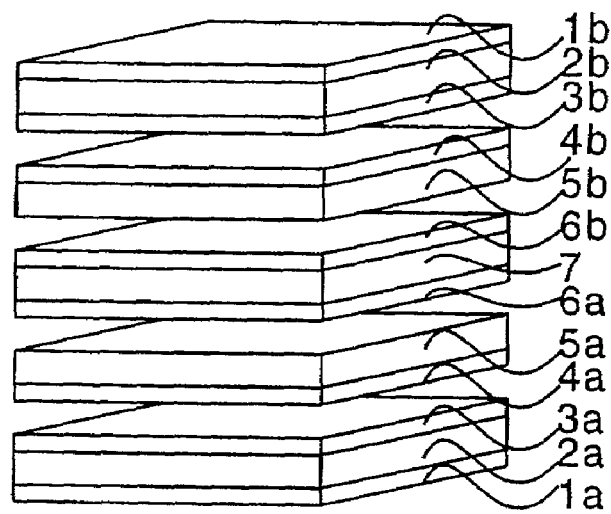
FIG. 1 is a sketch schematically illustrating fundamental constitution of a liquid crystal display of transmission type.

FIG. 1 is a sketch schematically illustrating fundamental constitution of a liquid crystal display of transmission type.

The display shown in FIG. 1 comprises a transparent protective film (1a), a polarizing membrane (2a), a transparent protective film (3a), a transparent support (4a), an optically anisotropic layer (5a), a lower substrate of liquid crystal cell (6a), rod-like liquid crystal molecules (7), an upper substrate of liquid crystal cell (6b), an optically anisotropic layer (5b), a transparent support (4b), a transparent protective film (3b), a polarizing membrane (2b) and a transparent protective film (1b), piled up in this order from the side of a back light (BL).

A set of the transparent protective film (1a) to the transparent protective film (3a) constitutes a lower polarizing plate. A set of the transparent support (4a) to the optically anisotropic layer (5a) constitutes a lower optical compensatory sheet. A set of the optically anisotropic layer (5b) to the transparent support (4a) constitutes an upper optical compensatory sheet. A set of the transparent protective film (3b) to the transparent protective film (1b) constitutes an upper polarizing plate. If a polymer film is used both as the transparent protective film (3a) and the transparent support (4a), the lower polarizing plate and the lower optical compensatory sheet can be combined. Also the upper optical compensatory sheet and the upper polarizing plate can be combined if a polymer film is used both as the transparent support (4b) and the transparent protective film (3b).

Figure 2:
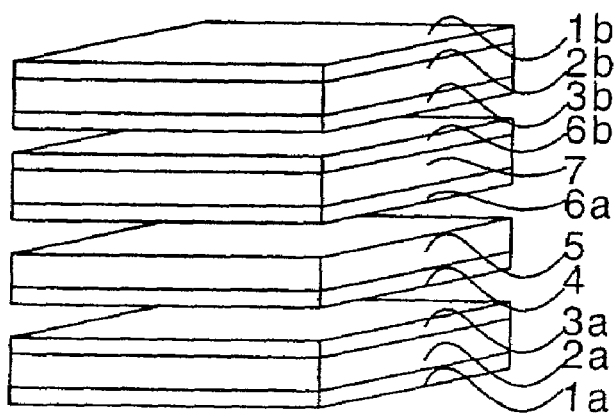
FIG. 2 is a sketch schematically illustrating fundamental constitution of another liquid crystal display of transmission type.

FIG. 2 is a sketch schematically illustrating fundamental constitution of another liquid crystal display of transmission type.

The display shown in FIG. 2 comprises a transparent protective film (1a), a polarizing membrane (2a), a transparent protective film (3a), a transparent support (4), an optically anisotropic layer (5), a lower substrate of liquid crystal cell (6a), rod-like liquid crystal molecules (7), an upper substrate of liquid crystal cell (6b), a transparent protective film (3b), a polarizing membrane (2b) and a transparent protective film (1b), piled up in this order from the side of a back light (BL).

A set of the transparent protective film (1a) to the transparent protective film (3a) constitutes a lower polarizing plate. A set of the transparent support (4) to the optically anisotropic layer (5) constitutes an optical compensatory sheet. A set of the transparent protective film (3b) to the transparent protective film (1b) constitutes an upper polarizing plate. If a polymer film is used both as the transparent protective film (3a) and the transparent support (4), the lower polarizing plate and the optical compensatory sheet can be combined.

Figure 3:
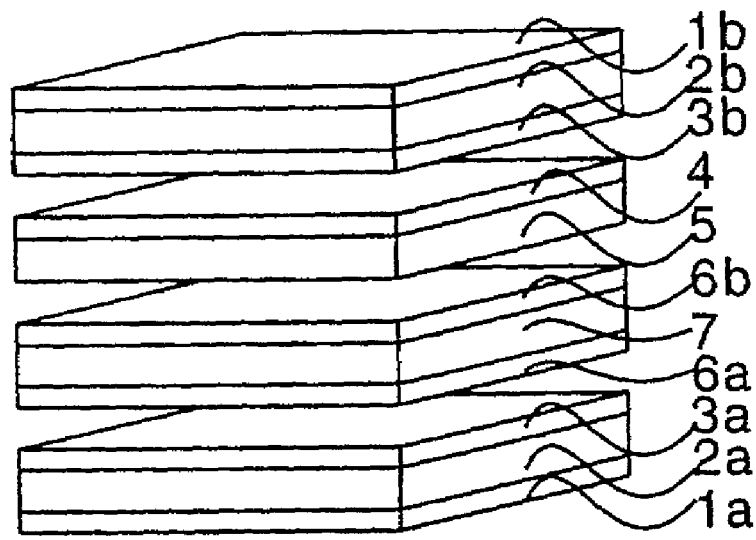
FIG. 3 is a sketch schematically illustrating fundamental constitution of a third liquid crystal display of transmission type.

FIG. 3 is a sketch schematically illustrating fundamental constitution of a third liquid crystal display of transmission type.

The display shown in FIG. 3 comprises a transparent protective film (1a), a polarizing membrane (2a), a transparent protective film (3a), a lower substrate of liquid crystal cell (6a), rod-like liquid crystal molecules (7), an upper substrate of liquid crystal cell (6b), an optically anisotropic layer (5), a transparent support (4), a transparent protective film (3b), a polarizing membrane (2b) and a transparent protective film (1b), piled up in this order from the side of a back light (BL).

A set of the transparent protective film (1a) to the transparent protective film (3a) constitutes a lower polarizing plate. A set of the optically anisotropic layer (5) to the transparent support (4) constitutes an optical compensatory sheet. A set of the transparent protective film (3b) to the transparent protective film (1b) constitutes an upper polarizing plate. If a polymer film is used both as the transparent support (4) and the transparent protective film (3b), the optical compensatory sheet and the upper polarizing plate can be combined.

Figure 4:
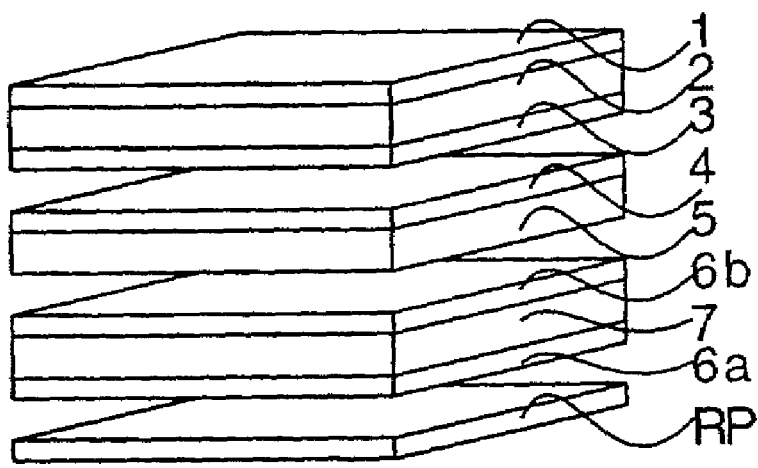
FIG. 4 is a sketch schematically illustrating fundamental constitution of a liquid crystal display of reflection type.

FIG. 4 is a sketch schematically illustrating fundamental constitution of a liquid crystal display of reflection type.

The display shown in FIG. 4 comprises a lower substrate of liquid crystal cell (6a), rod-like liquid crystal molecules (7), an upper substrate of liquid crystal cell (6b), an optically anisotropic layer (5), a transparent support (4), a transparent protective film (3), a polarizing membrane (2) and a transparent protective film (1), piled up in this order from the side of a reflection plate (RP).

A set of the optically anisotropic layer (5) to the transparent support (4) constitutes an optical compensatory sheet. A set of the transparent protective film (3) to the transparent protective film (1) constitutes a polarizing plate. If a polymer film is used both as the transparent support (4) and the transparent protective film (3), the optical compensatory sheet and the polarizing plate can be combined.

[Multi-Functional Monomer]

The optically anisotropic layer comprises a cross-linked polymer. The cross-linked polymer can comprise a main chain and a side chain that links four or more positions of the main chain.

The cross-linked polymer preferably comprises a repeating unit represented by the formula (I):

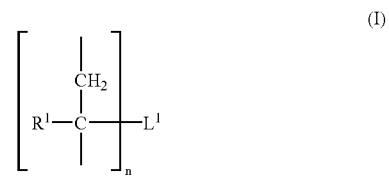

In the formula (I), $R^1$ is hydrogen or an alkyl group having 1 to 6 carbon atoms. $R^1$ preferably is hydrogen or an alkyl group having 1 to 3 carbon atoms, and more preferably is hydrogen or methyl.

In the formula (I), $L^1$ is n-valent linking side chain. $L^1$ preferably is n-valent linking side chain comprising an aliphatic group, an aromatic group, a heterocyclic group, —O—, —S—, —CO—, —CS—, —NH— or —N<.

The aliphatic group can have a cyclic structure, a branched structure or a unsaturated bond. The aliphatic group preferably has 1 to 20 carbon atoms, more preferably has 1 to 15 carbon atoms, and most preferably has 1 to 10 carbon atoms.

The aliphatic group can have a substituent group. Examples of the substituent groups include a halogen atom (F, Cl, Br, I), hydroxyl, carboxyl, sulfo, cyano, carbamoyl, a monovalent aromatic group, a monovalent heterocyclic group, —O—R, —CO—R, —NH—R, —N(—R)$_2$, —CO—O—R, —O—CO—R, —CO—NH—R, —CO—N(—R)$_2$ and —NH—CO—R. R is a monovalent aliphatic group, a monovalent aromatic group or a monovalent heterocyclic group. Carboxyl and sulfo can be dissociated or can form a salt.

The aromatic group preferably has a benzene ring or a naphthalene ring.

The aromatic group can have a substituent group. Examples of the substituent groups include a halogen atom (F, Cl, Br, I), hydroxyl, carboxyl, sulfo, cyano, carbamoyl, a monovalent aliphatic group, a monovalent aromatic group, a monovalent heterocyclic group, —O—R, —CO—R, —NH—R, —N(—R)$_2$, —CO—O—R, —O—CO—R, —CO—NH—R, —CO—N(—R)$_2$ and —NH—CO—R. R is a monovalent aliphatic group, a monovalent aromatic group or a monovalent heterocyclic group. Carboxyl and sulfo can be dissociated or can form a salt.

The heterocyclic group preferably has three-membered to seven-membered ring. The heterocyclic group can have an unsaturated bond. The heterocyclic group can have a substituent group. Examples of the substituent groups are the same as those of the aromatic group.

In the formula (I), n is an integer of 4 or more.

The cross-linked polymer is formed from multifunctional monomers having four or more double bonds. The double bond is preferably ethylenically (aliphatic) unsaturated.

The number of double bonds contained in one monomer is preferably in the range of 4 to 20, more preferably in the range of 5 to 15, and most preferably in the range of 6 to 10.

The multi-functional monomer is preferably an ester of a polyol having four or more hydroxyl groups with an unsaturated fatty acid. Examples of the unsaturated fatty acids include acrylic acid, methacrylic acid, maleic acid and itaconic acid. Acrylic acid and methacrylic acid are preferred.

The polyol having four or more hydroxyl groups preferably is a polyhydric alcohol having four or more hydroxyl groups or an oligomer of polyhydric alcohols having three or more hydroxyl groups. The oligomer has a structure in which polyhydric alcohols are combined with ether linkage, ester linkage or urethane linkage (preferably, with ether linkage).

Examples of the esters of polyol with (meth)acrylic acid include pentaerythritol tetra(meth)acrylate, dipentaerythritol penta(meth)acrylate, dipentaerythritol hexa(meth)acrylate, poly(meth)acrylate of polyether polyol, poly(meth)acrylate of polyester polyol and poly(meth)acrylate of polyurethane polyol.

Multi-functional monomers are commercially available. Examples of the commercially available monomers include Diabeam UK-4154 (Mitsubishi Rayon Co., Ltd.), Aronics M450 (Toa Gosei Co., Ltd.) and KAYARAD/DPRA, SR355 (Nippon Kayaku Co., Ltd.).

Two or more monomers can be used in combination.

The multi-functional monomers having four or more double bonds can be used in combination with other monomers having one to three double bonds. It is effective in controlling the viscosity and the mechanical strength to use the monomers in combination. The intermolecular interaction increases in proportion to the number of double bonds in the monomers, and accordingly the viscosity increases. When the viscosity increases, it takes relatively long time to align the liquid crystal molecules. On the other hand, the more double bonds the monomers have, the more the mechanical strength is improved. If the monomers are used in combination, proper viscosity and satisfying mechanical strength can be easily obtained.

The multi-functional monomers having four or more double bonds are used preferably in an amount of 20 to 80 wt. %, and more preferably in an amount of 30 to 70 wt. % based on the total amount of monomer.

The multi-functional monomers and the liquid crystal molecules are added in combination into the optically anisotropic layer. The amount of the multi-functional monomers is preferably in the range of 0.1 to 50 wt. %, and more preferably in the range of 1 to 20 wt. % based on the amount of the liquid crystal molecules.

[Transparent Support]

The term "transparent" means that light transmittance is not less than 80%.

The retardation values in plane (Re) and along the thickness direction (Rth) of the transparent film are in the ranges of 0 to 50 nm and 70 to 400 nm, respectively. They are defined by the following formulas (II) and (III), respectively:

$$Re = (nx - ny) \times d \quad (II)$$

$$Rth = [\{(nx+ny)/2\} - nz] \times d. \quad (III)$$

In the formulas (II) and (III), nx is a refractive index along the slow axis (direction giving the maximum refractive index) in the plane of the support.

In the formulas (II) and (III), ny is a refractive index along the fast axis (direction giving the minimum refractive index) in the plane of the support.

In the formula (III), nz is a refractive index along the thickness direction of the support.

In the formulas (II) and (III), d is the thickness of the support in terms of nm.

If two optical compensatory sheets are installed in a liquid crystal cell, the transparent support preferably has a Rth retardation value in the range of 70 to 200 nm.

If one optical compensatory sheets is installed in a liquid crystal cell, the transparent support preferably has a Rth retardation value in the range of 150 to 400 nm.

The transparent support preferably has birefringent indexes in plane (Δn: nx−ny) and along the thickness direction ({(nx+ny)/2}−nz) in the ranges of less than 0.002 and 0.001 to 0.04, respectively.

The transparent support is preferably a film of polymer. The polymer is preferably cellulose ester, more preferably cellulose acetate, and further preferably cellulose acetate having an acetic acid content in the range of 59.0 to 61.5%. The term "acetic acid content" means the weight ratio of the combined acetic acid based on the amount of the cellulose unit. The acetic acid content can be measured and calculated according to ASTM, D-817-91 (Testing methods for cellulose acetate etc.).

The polymer for the support preferably has a viscosity average degree of polymerization (DP) of not less than 250, and more preferably not less than 290. Further, the polymer preferably has a narrow molecular weight distribution in terms of Mw/Mn (wherein Mw means the weight average molecular weight, and Mn means the number average molecular weight), which can be measured by a gel permeation chromatography. The value of Mw/Mn is preferably in the range of 1.0 to 1.7, more preferably in the range of 1.30 to 1.65, and most preferably in the range of 1.40 to 1.60.

For controlling the retardation of the polymer film, an aromatic compound having at least two aromatic rings can be used as a retardation increasing agent.

If a cellulose acetate film is used as the polymer film, the aromatic compound is added in an amount of 0.01 to 20 weight parts, preferably in an amount of 0.05 to 15 weight parts, more preferably in an amount of 0.1 to 10 weight parts, based on 100 weight parts of cellulose acetate. Two or more aromatic compounds may be used in combination.

In the present invention, 'an aromatic ring' means not only an aromatic hydrocarbon ring but also an aromatic heterocyclic ring.

As the aromatic hydrocarbon ring, a six-membered ring (namely, a benzene ring) is preferred.

The aromatic heterocyclic ring is generally unsaturated. The aromatic heterocyclic ring is preferably a five-, six-or seven-membered ring, and more preferably a five-or six-membered ring. The aromatic heterocyclic ring generally has double bonds as many as possible. The hetero-atom in the ring preferably is nitrogen atom, sulfur atom or oxygen atom, and more preferably is nitrogen atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring.

Preferred aromatic rings are benzene ring, furan ring, thiophene ring, pyrrole ring, oxazole ring, thiazole ring, triazole ring, pyridine ring, pyrimidine ring, pyrazine ring and 1,3,5-triazine ring. Benzene ring and 1,3,5-triazine ring are more preferred.

The aromatic compound preferably contains at least one 1,3,5-triazine ring.

The number of aromatic rings in the aromatic compound is preferably in the range of 2 to 20, more preferably in the range of 2 to 12, further preferably in the range of 2 to 8, and most preferably in the range of 2 to 6.

The relation of the two or more aromatic rings is categorized into three cases, namely (a) the case in which the aromatic rings form a condensed ring, (b) the case in which the aromatic rings are connected through a single bond, and (c) the case in which the aromatic rings are connected through a linking group.

In case (c), a spiro-bonding is not formed because the rings are aromatic.

The relation of the aromatic rings may be any of the cases (a) to (c).

Examples of the condensed ring in the case (a) include indene ring, naphthalene ring, azulene ring, fluorene ring, phenanthrene ring, anthracene ring, acenaphthylene ring, naphthacene ring, pyrene ring, indole ring, isoindole ring, benzofuran ring, benzothiophene ring, indolizine ring, benzoxazole ring, benzothiazole ring, benzimidazole ring, benztriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxthine ring, phenoxazine ring and thianthrene ring. Preferred are naphthalene ring, azulene ring, indole ring, benzoxazole ring, benzothiazole ring, benzimidazole ring, benztriazole ring and quinoline ring.

The single bond in the case (b) is preferably between carbon atoms of the two aromatic rings. Two or more single bonds may connect the two aromatic rings to form an aliphatic ring or a non-aromatic ring between them.

The linking group in the case (c) is also preferably between carbon atoms of the two aromatic rings. The linking group is preferably an alkylene group, an alkenylene group, an alkynylene group, —CO—, —O—, —NH—, —S— and a combination thereof.

Examples of the linking group formed by the combination are shown below. In each of the following examples, the right and left terminals may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group may have substituent groups.

Examples of the substituent group include halogen atoms (F, Cl, Br, I), hydroxyl, carboxyl, cyano, amino, nitro, sulfo, carbamoyl, sulfamoyl, ureido, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amido group, an aliphatic sulfonamido group, an aliphatic substituted amino group, an aliphatic substituted carbamoyl group, an aliphatic substituted sulfamoyl group, an aliphatic substituted ureido group and a non-aromatic heterocyclic group.

The alkyl group preferably has 1 to 8 carbon atoms. A chain alkyl group is preferred to a cyclic one, and a straight chain alkyl group is particularly preferred. The alkyl group may further have a substituent group (e.g., hydroxyl, carboxyl, an alkoxy group, an alkyl-substituted amino group).

Examples of the (substituted) alkyl group include methyl, ethyl, n-butyl, n-hexyl, 2-hydroxyethyl, 4-carboxybutyl, 2-methoxyethyl and 2-diethylaminoethyl.

The alkenyl group preferably has 2 to 8 carbon atoms. A chain alkenyl group is preferred to a cyclic one, and a straight chain alkenyl group is particularly preferred. The alkenyl group may further have a susbstituent group. Examples of the alkenyl group include vinyl, allyl and 1-hexenyl.

The alkynyl group preferably has 2 to 8 carbon atoms. A chain alkynyl group is preferred to a cyclic one, and a straight chain alkynyl group is particularly preferred. The alkynyl group may further have a susbstituent group. Examples of the alkynyl group include ethynyl, 1-butynyl and 1-hexynyl.

The aliphatic acyl group preferably has 1 to 10 carbon atoms. Examples of the aliphatic acyl group include acetyl, propanoyl and butanoyl.

The aliphatic acyloxy group preferably has 1 to 10 carbon atoms. Examples of the aliphatic acyloxy group include acetoxy.

The alkoxy group preferably has 1 to 8 carbon atoms. The alkoxy group may further have a susbstituent group (e.g., another alkoxy group). Examples of the (substituted) alkoxy group include methoxy, ethoxy, butoxy and methoxyethoxy.

The alkoxycarbonyl group preferably has 2 to 10 carbon atoms. Examples of the alkoxycarbonyl group include methoxycarbonyl and ethoxycarbonyl.

The alkoxycarbonylamino group preferably has 2 to 10 carbon atoms. Examples of the alkoxycarbonylamino group include methoxycarbonylamino and ethoxycarbonylamino.

The alkylthio group preferably has 1 to 12 carbon atoms. Examples of the alkylthio group include methylthio, ethylthio and octylthio.

The alkylsulfonyl group preferably has 1 to 8 carbon atoms. Examples of the alkylsulfonyl group include methanesulfonyl and ethanesulfonyl.

The aliphatic amido group preferably has 1 to 10 carbon atoms. Examples of the aliphatic amido group include acetoamido.

The aliphatic sulfonamido group preferably has 1 to 8 carbon atoms. Examples of the aliphatic sulfonamido group include methanesulfonamido, butanesulfonamido and n-octanesulfonamido.

The aliphatic substituted amine group preferably has 1 to 10 carbon atoms. Examples of the aliphatic substituted amine group include dimethylamino, diethylamino and 2-carboxyethyl amino.

The aliphatic substituted carbamoyl group preferably has 2 to 10 carbon atoms. Examples of the aliphatic substituted carbamoyl group include methylcarbamoyl and diethylcarbamoyl.

The aliphatic substituted sulfamoyl group preferably has 1 to 8 carbon atoms. Examples of the aliphatic substituted sulfamoyl group include methylsulfamoyl and diethylsulfamoyl.

The aliphatic substituted ureido group preferably has 2 to 10 carbon atoms. Examples of the aliphatic substituted ureido group include methylureido.

Examples of the non-aromatic heterocyclic group include piperidino and morpholino.

The retardation increasing agent has a molecular weight of 300 to 800.

Concrete examples of the retardation increasing agent are described in Japanese Patent Provisional Publication Nos. 2000-111014, 2000-275434 and International Patent Application No. WO00/65384.

The polymer film is preferably prepared according to a solvent casting method. The solvent casting method comprises the steps of dissolving cellulose ester in an organic solvent to prepare a solution (dope) and casting the dope to prepare a film.

The organic solvent is preferably selected from the group consisting of an ether having 3 to 12 carbon atoms, a ketone having 3 to 12 carbon atoms, an ester having 3 to 12 carbon atoms and a halogenated hydrocarbon having 1 to 6 carbon atoms.

The ether, ketone and ester may have a cyclic structure. A compound having two or more functional groups of the ether (—O—), ketone (—CO—) and ester (—COO—) can also be used as the organic solvent. The organic solvent can have another functional group such as alcoholic hydroxyl. In the case where the organic solvent has two or more functional group, the number of the carbon atoms is defined as a compound having one functional group, which is optionally selected from the group of the organic solvents.

Examples of the ethers having 3 to 12 carbon atoms include diisopropyl ether, dimethoxymethane, dimethoxyethane, 1,4-dioxane, 1,3-dioxolane, tetrahydrofuran, anisole and phenetol.

Examples of the ketones having 3 to 12 carbon atom include acetone, methyl ethyl ketone, diethyl ketone, diisobutyl ketone, cyclohexanone and methylcyclohexanone.

Examples of the esters having 3 to 12 carbon atoms include ethyl formate, propyl formate, pentyl formate, methyl acetate, ethyl acetate and pentyl acetate.

Examples of the compounds having two or more kinds of functional groups include 2-ethoxyethyl acetate, 2-methoxyethanol and 2-butoxyethanol.

The halogenated hydrocarbon preferably has one or two carbon atoms, and more preferably has one carbon atom. The halogen atom of the halogenated hydrocarbon preferably is chlorine. The ratio of the substitution of hydrogen with halogen is preferably in the range of 25 to 75 mole %, more preferably in the range of 30 to 70 mole %, further preferably in the range of 35 to 65 mole %, and most preferably in the range of 40 to 60 mole %. Methylene chloride is a representative halogenated hydrocarbon.

Two or more organic solvents can be used in combination.

A polymer solution can be prepared according to a conventional method. The conventional method means that the solution is prepared at a temperature of not lower than 0° C. (ordinary or elevated temperature). The preparation of the solution can be conducted by using a process and apparatus for preparation of a dope in a conventional solvent casting method. The conventional method preferably uses a halogenated hydrocarbon (particularly methylene chloride) as an organic solvent.

The amount of the polymer is so adjusted that a prepared solution contains cellulose ester in an amount of 10 to 40 wt. %. The amount of cellulose ester more preferably is 10 to 30 wt. %. An optional additive (described below) can be added to an organic solvent.

The solution can be prepared by stirring the polymer and an organic solvent at an ordinary temperature (0 to 40° C.). A solution of a high concentration is preferably prepared by stirring them at an elevated temperature and at a high pressure. In that case, the polymer and the organic solvent are placed in a closed vessel, and are stirred at an elevated temperature and at a high pressure. The temperature is set to be higher than the boiling point at atmospheric pressure but lower than the boiling point of the solvent at the high pressure. In concrete, the heating temperature is usually not lower than 40° C., preferably in the range of 60 to 200° C., and more preferably in the range of 80 to 110° C.

The components can be preliminary dispersed coarsely, and the coarse dispersion can be placed in the vessel. Otherwise, the components can also be introduced into the vessel in series. The vessel should be equipped with a stirring device. A pressure in the vessel can be formed by introducing an inert gas such as nitrogen gas into the vessel, or by heating and evaporating the solvent to increase the vapor pressure. Further, the components can be added to the vessel at a high pressure after the vessel is sealed.

The vessel is preferably heated outside. For example, the vessel can be heated by a jacket type heating apparatus. Further, a plate heater can be placed outside the vessel. Furthermore, a heated liquid can be circulated in a tube outside the vessel.

The components are stirred preferably by a stirring wing placed in the vessel. The stirring wing has such a length that the end of the wing reaches near the wall of the vessel. A scratching wing is preferably attached to the end of the stirring wing to scratch the solution remaining on the wall of the vessel.

The vessel can have a meter such as a manometer or a thermometer. The components are dissolved in the solvent in the vessel. The prepared dope is cooled in the vessel, or the dope is cooled after it is taken out of the vessel. The dope can be cooled by a heat exchanger.

The solution can be also prepared according to a cooling dissolution method. According to the cooling dissolution method, the polymer can be dissolved even in organic solvents in which the polymer cannot be dissolved according to a conventional method. Further, if organic solvents in which the polymer can be dissolved according to a conventional method are used, the cooling dissolution method can prepare a solution more quickly.

At the first stage of the cooling dissolution method, the polymer is gradually added to an organic solvent while stirring at room temperature.

The amount of the polymer is in the range of 10 to 40 wt. % based on the amount of the mixture, and is preferably in the range of 10 to 30 wt. %. An optional additive (described below) may be added to the mixture.

At the next stage, the mixture is cooled to a temperature of −100 to −10° C., preferably −80 to −10° C., more preferably −50 to −20° C., and most preferably −50 to −30° C. The mixture can be cooled in a dry ice/methanol bath (−75° C.) or in a cooled diethylene glycol solution (−30 to −20° C.). At the cooling stage, the mixture of the polymer and the solvent generally solidify.

The cooling rate is preferably faster than 4° C. per minute, more preferably faster than 8° C. per minute, and most preferably faster than 12° C. per minute. The cooling rate is preferably as fast as possible. However, a theoretical upper limit of the cooling rate is 10,000° C. per second, a technical upper limit is 1,000° C. per second, and a practical upper limit is 100° C. per second. The cooling rate means the change of temperature at the cooling stage per the time taken to complete the cooling stage. The change of temperature means the difference between the temperature at which the cooling stage is started and the temperature at which the cooling stage is completed.

The solidified mixture is warmed to a temperature of 0 to 200° C., preferably 0 to 150° C., more preferably 0 to 120° C., and most preferably 0 to 50° C. to dissolve the cellulose ester in the solvent. The mixture can be warmed by keeping it at room temperature or on a hot bath.

The warming rate is preferably faster than 4° C. per minute, more preferably faster than 8° C. per minute, and most preferably faster than 12° C. per minute. The warming rate is preferably fast as possible. However, a theoretical upper limit of the warming rate is 10,000° C. per second, a technical upper limit is 1,000° C. per second, and a practical upper limit is 100° C. per second. The warming rate means the change of temperature at the warming stage per the time taken to complete the warming stage. The change of temperature means the difference between the temperature at which the warming stage is started and the temperature at which the warming stage is completed.

Thus a dope is formed as a uniform solution. If the polymer is not sufficiently dissolved, the cooling and warming steps can be repeated. The dope is observed with eyes to determine whether the polymer is sufficiently dissolved or not.

A sealed vessel is preferably used in the cooling dissolution method to prevent contamination of water, which is caused by dew condensation at the cooling step. The time for the cooling and warming stages can be shortened by conducting the cooling step at a high pressure and conducting the warming step at a low pressure. A pressure vessel is preferably used at a high or low pressure.

In the case that cellulose acetate having acetic acid content of 60.9% and viscosity average polymerization degree of 299 is dissolved in methyl acetate by a cooling dissolution method to form 20 wt. % solution, the solution has a pseudo sol-gel phase transition point at about 33° C., which is measured by differential scanning calorimetric analysis (DSC). Under the transition point, the solution forms a uniform gel. Therefore, the solution should be stored at a temperature higher than the transition point, preferably at a temperature about 10° C. higher than the point. The pseudo sol-gel phase transition point depends on the combined average acetic acid content of cellulose acetate, the viscosity average degree of polymerization, the concentration of the dope and the nature of the solvent.

From the obtained polymer solution (dope), a polymer film is prepared according to a solvent casting method. The above-described retardation increasing agent is preferably added to the dope.

The dope is cast on a drum or a band, and then evaporated to form a polymer film.

Before casting the dope, the concentration of the dope is so adjusted that the solid content of the dope is in the range of 18 to 35 wt. %. The surface of the drum or band is preferably polished to give a mirror plane. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45 (1970)-4554, 49 (1974)-5614, Japanese Patent Provisional Publication Nos. 60 (1985)-176834, 60 (1985)-203430 and 62 (1987)-115035.

The drum or band preferably has a surface temperature of not higher than 10° C. when the dope is cast on the support. After casting the dope, the dope is preferably dried with flowing air for at least 2 seconds. The formed film is peeled off the drum or band, and the film can be further dried with hot air to remove the solvent remaining in the film. The temperature of the air can be gradually elevated from 100 to 160° C. The above-mentioned method is described in Japanese Patent Publication No. 5 (1993)-17844. According to the method, the time for casting and peeling steps can be shortened. The method requires that the dope be set to gel at the surface temperature of the drum or band. The dope formed according to the present invention satisfies the requirement.

A film having two or more layers can be formed by simultaneously casting (co-casting) the dopes. Before casting the dopes, the concentration of each dope is so adjusted that the solid content is in the range of 10 to 50 wt. %.

In the case where two or more cellulose acetate solutions are used, the solutions may be cast from nozzles provided at intervals in the transferring direction of the support to form a layered film. This method is described in, for example, Japanese Patent Provisional Publication Nos. 61 (1986)-158414, 1 (1989)-122419 and 11 (1999)-198285. The solutions may be simultaneously cast from two nozzles to form a layered film. This method is described in, for example, Japanese Patent Publication No. 60 (1985)-27562, Japanese Patent Provisional Publication Nos. 61 (1986)-94724, 61 (1986)-947245, 61 (1986)-104813, 61 (1986)-158413 and 6 (1994)-134933.

The method described in Japanese Patent Provisional Publication No. 56 (1981)-162617 can be also adopted. In that method, a highly viscous polymer solution is enclosed with a low viscous one, and then the thus-combined solutions are simultaneously extruded and cast.

Further, the method described in, for example, Japanese Patent Publication No. 44 (1969)-20235 may be adopted. In the method, a film is beforehand formed from a solution extruded out of one of two nozzles. After the formed film is peeled and reversely placed on the support, another solution is extruded from the other nozzle to cast onto the film (on the surface having faced to the support) to form a layered film.

The polymer solutions may be the same or different from each other. Besides a polymer film for the transparent support, other functional layers (e.g., adhesive layer, dye layer, antistatic layer, anti-halation layer, ultraviolet layer, polarizing layer) can be also formed by simultaneous casting.

In the case where a film having a single layer is formed by the solvent casting method, it is necessary to extrude a dope of high concentration and high viscosity. That dope is generally so unstable that solid particles are often deposited and that the formed film often has poor evenness. If such viscous dope is extruded simultaneously from plural nozzles onto the support, a film having excellent evenness can be prepared. Further, since the thick dope is rapidly dried, the film can be rapidly produced.

A plasticizer can be added to the polymer film to improve the mechanical strength of the film. The plasticizer has another function of shortening the time for the drying process. Phosphoric esters and carboxylic esters are usually used as the plasticizer. Examples of the phosphoric esters include triphenyl phosphate (TPP) and tricresyl phosphate (TCP). Examples of the carboxylic esters include phthalic esters and citric esters. Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include triethyl o-acetylcitrate (OACTE) and tributyl o-acetylcitrate (OACTB). Examples of the other carboxylic esters include butyl oleate, methylacetyl ricinoleate, dibutyl sebacate and various trimellitic esters. Phthalic ester plasticizers (DMP, DEP, DBP, DOP, DPP, DEHP) are preferred. DEP and DPP are particularly preferred.

The amount of the plasticizer is preferably in the range of 0.1 to 25 wt. %, more preferably in the range of 1 to 20 wt.

%, and most preferably in the range of 3 to 15 wt. % based on the amount of the polymer.

Deterioration inhibitors (e.g., antioxidizing agent, peroxide decomposer, radical inhibitor, metal inactivating agent, oxygen scavenger, amine) can be incorporated into the polymer film. The deterioration inhibitors are described in Japanese Patent Provisional Publication Nos. 3 (1991)-199201, 5 (1993)-1907073, 5 (1993)-194789, 5 (1993)-271471 and 6 (1994)-107854. The deterioration inhibitor is preferably added in the range of 0.01 to 1 wt. %, and more preferably in the range of 0.01 to 0.2 wt. % based on the amount of the prepared solution (dope). If the amount is less than 0.01 wt. %, the effect of the deterioration inhibitor can not be expected. If the amount is more than 1 wt. %, the inhibitor would bleed out on the surface of the film. Butyrated hydroxytoluene (BHT) and tribenzylamine (TBA) are particularly preferred deterioration inhibitors.

For improving thermal conductivity of the transparent support, various highly thermal conductive particles can be added to the polymer film. The thermal conductive particles are preferably made of transparent material. Examples of the material include aluminum nitride, silicon nitride, boron nitride, magnesium nitride, silicon carbide, aluminum oxide, silicon oxide, zinc oxide, magnesium oxide, carbon (including diamond) and metals.

The highly thermal conductive particles have a mean particle size preferably in the range of 0.05 to 80 μm, more preferably in the range of 0.1 to 10 μm.

The amount of the thermal conductive particles is preferably in the range of 5 to 100 weight parts, more preferably in the range of 5 to 50 weight parts based on 100 weight parts of the polymer.

For preventing the polymer film from being swollen with moisture (for reducing the moisture swelling coefficient of the polymer film), the film is preferably stretched. The stretching is preferably performed so that distortions in all the directions in plane may be evenly inhibited, and hence biaxial stretching is preferred.

In the biaxial stretching, the film is simultaneously or successively stretched in two directions (namely, simultaneous biaxial stretching or successive biaxial stretching). The successive biaxial stretching is preferred in consideration of continuous production. The process of the successive biaxial stretching comprises the steps of casting the dope, peeling the formed film from the band or drum, stretching the film laterally (perpendicularly to the casting direction), and then stretching the film longitudinally. The longitudinal stretching step may be performed prior to the lateral stretching.

Japanese Patent Provisional Publication Nos. 62 (1987)-115035, 4 (1992)-152125, 4 (1992)-284211, 4 (1992)-298310 and 11 (1999)-48271 describe the lateral stretching, which is performed at room temperature or an elevated temperature. The elevated temperature is preferably below the glass transition point of the film. The film can be stretched while being dried in the film production. Preferably, the film is stretched while the solvent still remains in the film. The longitudinal stretching can be performed, for example, by controlling the conveying rollers so that the speed of winding up the film may be faster than that of peeling the film. The lateral stretching, on the other hand, can be performed by gradually widening the interval between tenters clipping both sides of the conveyed film. Otherwise, after the film is dried, it can be stretched by means of a stretching machine (preferably, the film is monoaxially stretched by means of a long stretching machine). The expanding ratio of stretching (the ratio of length increased by stretching based on the original length) is preferably in the range of 5 to 50%, more preferably in the range of 10 to 40%, most preferably in the range of 15 to 35%.

The steps from casting to drying may be performed under relatively inert atmosphere (e.g., nitrogen gas atmosphere). For winding up the film, generally used machines can be used. Examples of the winding method include constant tension method, constant torque method, taper tension method and programmed tension control method by which inner stress is kept constant.

By the above-described biaxial stretching, the moisture swelling coefficient of the polymer film can be reduced. The moisture swelling coefficient is determined by measuring the change of length of the sample when the relative humidity is changed with the temperature kept constant.

In order not to unevenly increase the transmittance at the peripheral area of the film, the cellulose acetate film has a moisture swelling coefficient of preferably $30 \times 10^{-5}$/% RH or less, more preferably $15 \times 10^{-5}$/% RH or less, most preferably $10 \times 10^{-5}$/% RH or less. The less the moisture swelling coefficient is, the more it is preferred. However, it is usually $1.0 \times 10^{-5}$/% RH or more.

The moisture swelling coefficient is determined in the following manner. First, the formed polymer film is cut to prepare a sample (5 mm width×20 mm length). The end of the sample is fixed, and the sample is suspended at 25° C., 20% RH ($R_0$). At the free end of the sample, a weight of 0.5 g is further suspended. After 10 minutes, the length of the sample ($L_0$) is measured. The humidity is then changed to 80% RH ($R_1$) while the temperature is kept at 25° C., and the length ($L_1$) is measured again. From the measured values, the moisture swelling coefficient is calculated according to the following formula. Ten samples are prepared from the same film, and the procedure is repeated. The calculated values are averaged to determine the moisture swelling coefficient.

Moisture swelling coefficient $[/\%RH] = \{(L_1-L_0)/L_0\}/(R_1-R_0)$

The less free volume the polymer film has, the less the size of the film is changed with moisture. The free volume depends upon the amount of remaining solvent used in film forming process. The less the solvent remains, the less the size changes.

For reducing the remaining solven, the film is dried at a high temperature for long time. However, if too much time is spent for drying, the productivity is lowered. Accordingly, the amount of remaining solvent is preferably in the range of 0.01 to 1 wt. %, more preferably in the range of 0.02 to 0.07 wt. %, most preferably in the range of 0.03 to 0.05 wt. %.

The amount of remaining solvent is so controlled that the polymer film may be produced at a low cost with high productivity.

As another method for reducing the film-size change with moisture, a compound having hydrophobic groups is preferably added. Preferred examples of the hydrophobic groups include alkyl groups and phenyl. The compound is preferably selected from the plasticizers or the deterioration inhibitors which can be added in to the polymer film. Examples of the compound include triphenyl phosphate (TPP) and tribenzylamine (TBA).

The amount of the compound having hydrophobic groups is preferably in the range of 0.01 to 10 wt. %, more preferably in the range of 0.1 to 5 wt. %, most preferably in the range of 1 to 3 wt. %.

The polymer film is preferably subjected to a surface treatment. Examples of the surface treatment include corona discharge treatment, glow discharge treatment, flame treatment, alkali saponification treatment and ultraviolet (UV) treatment. In place of the surface treatment, an undercoating layer (described in Japanese Patent Provisional Publication No. 7 (1995)-333433) may be provided.

The film after the surface treatment has a surface energy preferably in the range of not more than 55 mN/m, more preferably in the range of 60 to 75 mN/m.

For ensuring the evenness of the film, the surface treatment is preferably performed so that the temperature of the film may be not higher than Tg (glass transition temperature) of the film (namely, not higher than 150° C.).

In the case where the polymer film is a cellulose acetate film, the film is preferably subjected to acid or alkali treatment. This means the cellulose acetate film is preferably subjected to saponification treatment (particularly preferably, alkali saponification treatment).

The alkali saponification treatment can be cyclically performed by the steps of immersing the film in an alkali solution, washing with water and drying. Before washing, the film may be neutralized with an acidic solution. Examples of the alkali solution include aqueous solutions of potassium hydroxide and sodium hydroxide. The normality of hydroxyl ion in the alkali solution is preferably in the range of 0.1 to 3.0 N, more preferably in the range of 0.5 to 2.0 N. The alkali solution is kept at a temperature preferably in the range of 0 to 90° C., more preferably in the range of 40 to 70° C.

For efficiently saponifying the film, it is also preferred to apply an alkali solution onto the cellulose acetate film. After the saponification, the film is preferably washed to remove the alkali solution from the surface. If the saponification is performed by applying, the alkali solution preferably has good wettability onto the cellulose acetate film. The wettability of the solution mainly depends of what kind of solvent is used. Examples of the solvent giving good wettability include alcohols (e.g., isopropyl alcohol, n-butanol, methanol, ethanol). As an auxiliary solvent, water or glycol (e.g., propylene glycol, ethylene glycol) is preferably added.

The surface energy can be measured by the contact angle method, the wet heating method or the adsorption method (these methods are described in 'The basic theory and application of wetting (written in Japanese)', published by Realize Co., Ltd, 1989). The contact angle method is preferred. In that method, two solutions having known surface energies are dropped onto the film. The contact angle of each drop is measured, and the surface energy of the film is calculated from the measured contact angles. The contact angle is, by definition, an angle (including the drop) between the film surface and the tangent of the drop surface at their crossing point.

[Orientation Layer]

An orientation layer has a function for aligning the liquid crystal molecules.

The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light.

The orientation layer is preferably formed by rubbing a polymer. The polymer for orientation layer generally has a molecular structure for aligning the liquid crystal molecules.

Besides the function of aligning the liquid crystal molecules, the polymer for the orientation layer in the invention preferably has a molecular structure in which a side chain having cross-linkable functional groups (e.g., double bonds) is connected to the main chain. The side chain can also have a group having the function of aligning the liquid crystal molecules.

Examples of the main chain of the polymer for orientation layer include polyvinyl alcohol, polyacrylic acid, polymethacrylic acid, polyacrylic esters, polymrthacrylic esters (e.g., polymethyl methacrylate), polyacrylamide (e.g., poly (N-methylol acrylamide)), polymethacrylamide, polyolefin (e.g., polystyrene, polyvinyltoluene, polyethylene, polypropylene). chlorinated polyolefin (e.g., chlorosulfonated polyethylene, polyvinyl chloride), cellulose ester (e.g., cellulose nitrate), polyester (e.g., polycarbonate), polyimide, polyamide (e.g., polyamic acid), polyvinyl ester (e.g., polyvinyl acetate) and cellulose ether (e.g., carboxymethylcellulose). Copolymers comprising two or more kinds of repeating units (e.g., acrylic acid/methacrylic acid copolymer, styrene/maleinimide copolymer, styrene/vinyltoluene copolymer, vinyl acetate/vinyl chloride copolymer, ethylene/vinyl acetate copolymer) are also usable. Further, reaction products of silane coupling agents can be also used as the polymer for the orientation layer.

Poly(N-methylol acrylamide), carboxymethylcellulose, polyvinyl alcohol, polyacrylic acid, polymethacrylic acid, polyimide and polyamide are preferred, and polyvinyl alcohol is particularly preferred.

The saponification degree of polyvinyl alcohol is preferably in the range of 70 to 100%, more preferably in the range of 80 to 100%, most preferably in the range of 85 to 95%. The polymerization degree of polyvinyl alcohol is preferably in the range of 100 to 3,000.

The side chain having the function of aligning the liquid crystal molecules generally has hydrophobic groups as functional groups, which are determined according to the liquid crystal molecules and the aligning mode.

In order that the polymer for orientation layer and the multi-functional monomers in the optically anisotropic layer are copolymerized, the polymer has a structure in which the side chain having cross-linkable functional groups is connected to the main chain, or in which the cross-linkable groups is introduced to the side chain having the function of aligning the liquid crystal molecules. As a result, strong covalent bonds are formed not only among the multi-functional monomers but also in the polymer for the orientation layer and between the polymer and the multi-functional monomers. Consequently, the mechanical strength of optical compensatory sheet can be remarkably improved by introducing the cross-linkable functional groups into the polymer for orientation layer.

As the multi-functional monomer preferably does, the cross-linkable functional group introduced into the polymer also preferably has a double bond. Examples of the cross-linkable functional group having a double bond are shown below.

(Q1)

(Q2)

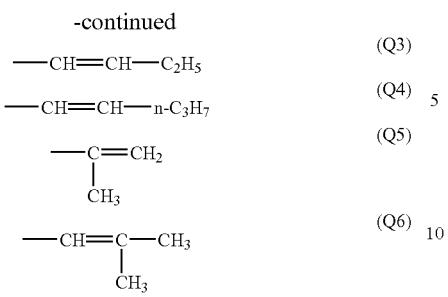

The cross-linkable functional group may be connected to the main chain of the polymer for orientation layer either directly or via a linking group.

The linking group is preferably a divalent linking group selected from the group consisting of an alkylene group, an arylene group, —CO—, —NH—, —O—, —S— and combinations thereof. The alkylene group preferably has 1 to 12 carbon atoms. The arylene group is preferably phenylene.

The polymer for orientation layer (particularly, the polymer having a main chain of polyvinyl alcohol) can be cross-linked by a cross-linking agent besides the above-described cross-linkable functional groups.

Examples of the cross-linking agent include aldehydes, N-methylol compounds, dioxane derivatives, compounds that works when the carboxylic group is activated, active vinyl compounds, active halogen compounds, isooxazoles and dialdehyde starch. Examples of the aldehydes include formaldehyde, glyoxal and glutaraldehyde. Examples of the N-methylol compounds include dimethylol urea and methyloldi-methylhydantoin. Examples of the dioxane derivatives include 2,3-dihydroxydioxane. Examples of the compounds that works when the carboxylic group is activated include carbenium, 2-naphthalenesulfonate, 1,1-bispyrrolidino-1-chloropyridinium and 1-morpholinocarbonyl-3-(sulfonatoaminomethyl). Examples of the active vinyl compounds include 1,3,5-triacryloyl-hexahydro-s-triazine, bis-(vinylsulfone)methane and N,N'-methylenebis-[β-vinylsulfonyl]propionamide]. Examples of the active vinyl compounds include 2,4-dichloro-6-hydroxy-s-triazine. Aldehydes are preferred, and glutaraldehyde is particularly preferred. Two or more cross-linking agents may be used in combination.

The amount of the cross-linking agent is in the range of preferably 0.1 to 20 wt. %, and more preferably 0.5 to 15 wt. % based on the amount of the polymer. The amount of non-reacted cross-linking agent remaining in the orientation layer is preferably not more than 1.0 wt. %, and more preferably not more than 0.5 wt. % based on the amount of the orientation layer.

For forming the orientation layer, a coating solution containing the polymer is applied on the transparent support. As the solvent of the solution, an organic solvent (e.g., methanol) or a mixed solvent of water and an organic solvent is preferred. As the coating method, known methods such as spin-coating, dip-coating, curtain-coating, extrusion-coating, bar-coating and E-type coating can be adopted. The E-type coating method is particularly preferred.

The applied solution is dried at a temperature of preferably 20 to 110° C., more preferably 60 to 100° C., and most preferably 80 to 100° C. The time for drying the applied solution is preferably in the range of 1 minute to 36 hours, more preferably in the range of 5 to 30 minutes.

The rubbing treatment can be conducted in the known manner. The surface of the layer is rubbed with paper, cloth (gauze, felt, nylon, polyester) or rubber along a certain direction, so as to give the aligning function. Generally, the layer is rubbed several times with cloth on which fibers having the same length and thickness are provided.

In the optically anisotropic layer, the liquid crystal molecules are provided on the orientation layer by which the molecules are aligned. The polymer of orientation layer and the multi-functional monomers in the optically anisotropic layer may be co-polymerized, if needed. Further, the polymer of orientation layer may be cross-linked with the cross-linking agent.

The orientation layer has a thickness preferably in the range of 0.1 to 10 μm.

[Optically Anisotropic Layer]

The optically anisotropic layer is formed from liquid crystal molecules. As the liquid crystal molecules, discotic or rod-like liquid crystal molecules are preferably used.

Preferred examples of the rod-like liquid crystal molecules include azomethines, azoxy molecules, cyanobiphenyls, cyanophenyl esters, benzoic esters, phenyl cyclohexanecarbonate esters, cycnophenylcyclohexanes, cyanosubstituted phenylpyrimidines, alkoxy-substituted phenylpyrimidines, phenyldioxanes, tolans and alkenylcyclo-hexylbenzonitriles. Further, some metal complexes are included in the rod-like liquid crystal molecules.

Descriptions of the rod-like liquid crystal molecules are found in "Kagaku-Sosetsu, Ekisho no Kageku" (written in Japanese), vol. 22 (1994), Chapters 4, 7 and 11; and "Ekisho Devise Handbook" (written in Japanese), chapter 3.

The discotic liquid crystal molecules are also described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)).

The liquid crystal molecules preferably have double bonds as the functional groups. If so, the liquid crystal molecules can be co-polymerized with the multi-functional monomers in the optically anisotropic layer. Further, strong covalent bonds are formed not only among the multi-functional monomers but also among the liquid crystal molecules and between the liquid crystal molecules and the multi-functional monomers. Consequently, the mechanical strength of optical compensatory sheet can be remarkably improved by introducing the cross-linkable functional groups into the liquid crystal molecules.

A polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group (polymerizable discotic liquid crystal molecule) preferably is a compound represented by the following formula (IV):

$$D(-L-Q)_n \qquad (IV)$$

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).
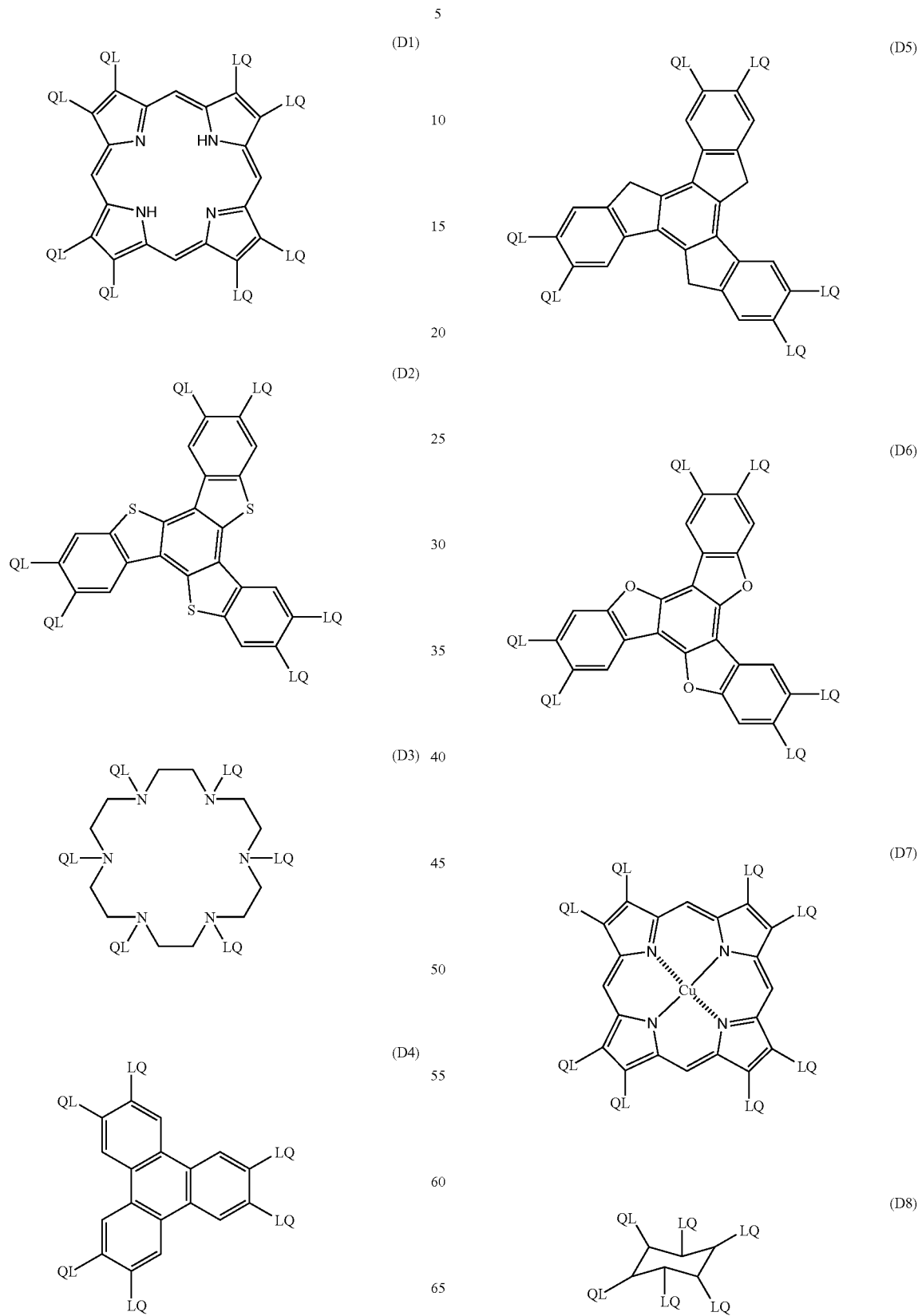

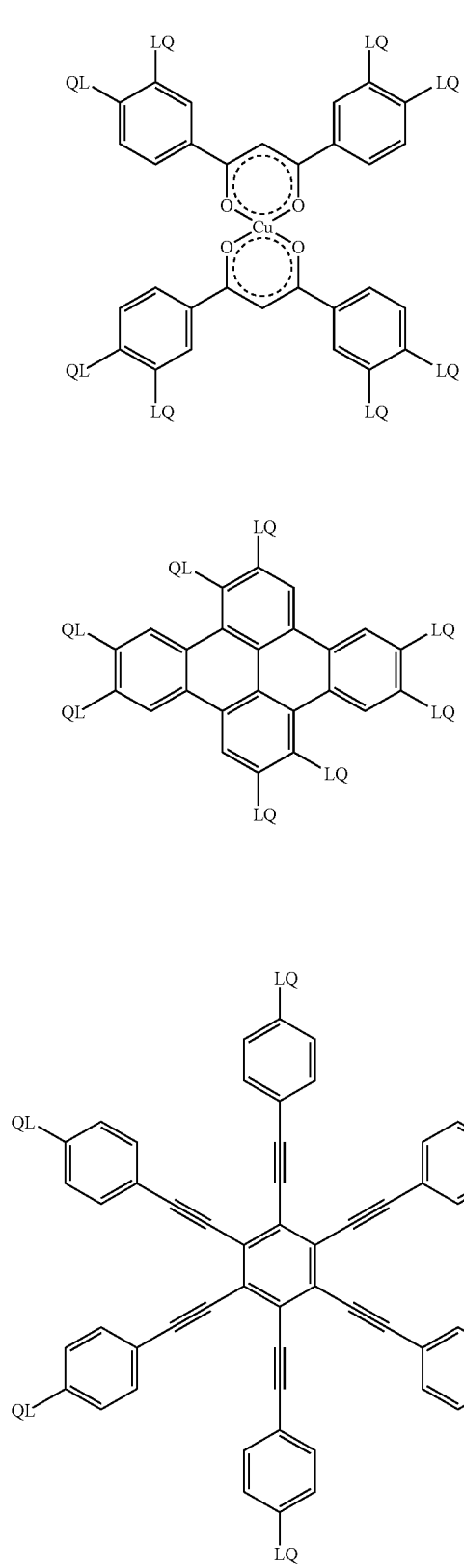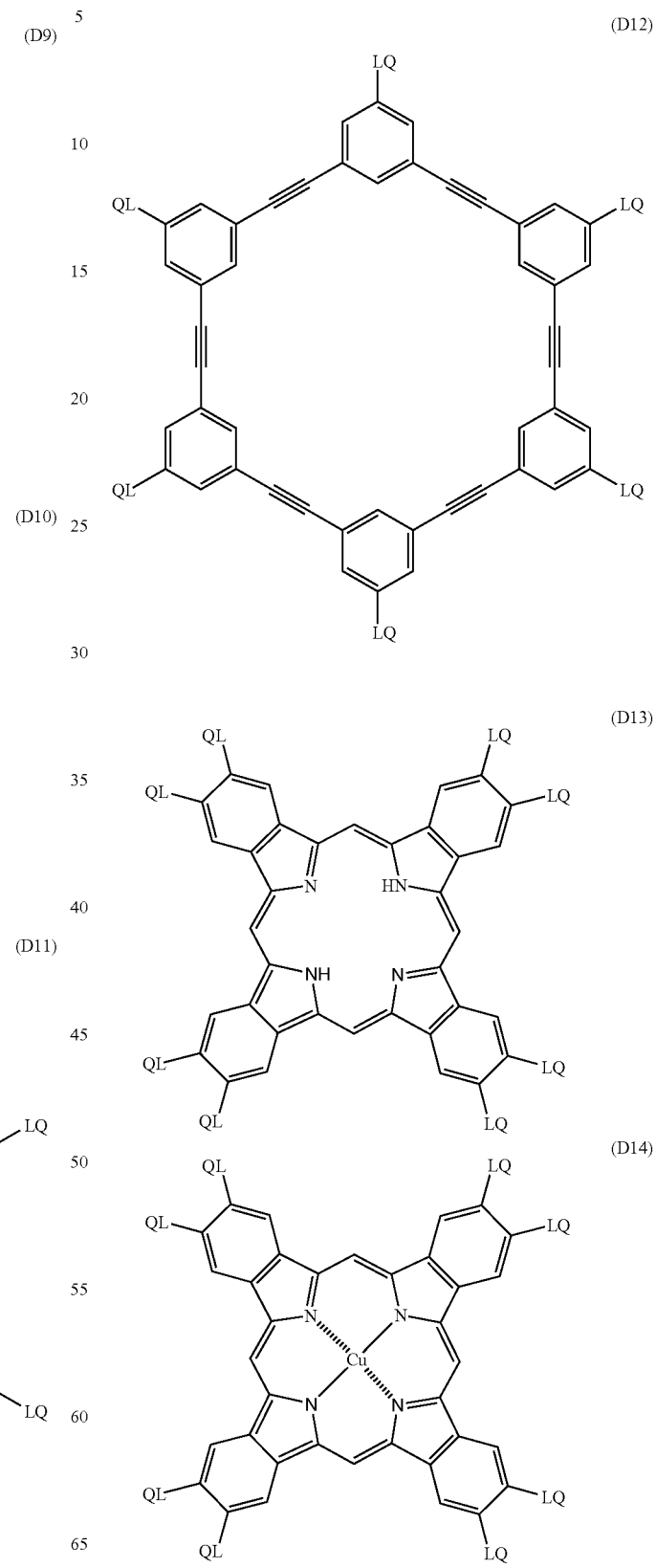

-continued

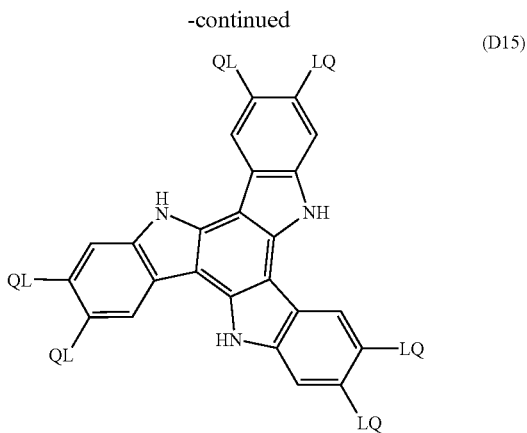

(D15)

In the formula, the divalent linking group (L) preferably is selected from the group consisting of an alkylene group, an alkenylene group, an arylene group, —CO—, —NH—, —O—, —S— and combinations thereof. The divalent linking group (L) more preferably is a divalent linking group comprising at least two divalent groups selected from the group consisting of an alkylene group, an alkenylene group, an arylene group, —CO—, —NH—, —O— and —S—. The divalent linking group (L) further preferably is a divalent linking group comprising at least two divalent groups selected from the group consisting of an alkylene group, an alkenylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms.

Examples of the divalent linking groups (L) are shown below. In the examples, the left side is attached to the discotic core (D), and the right side is attached to the polymerizable group (Q). The AL means an alkylene group or an alkenylene group. The AR means an arylene group. The alkylene group, the alkenylene group and the arylene group may have substituent groups (e.g., alkyl group).

L1: -AL-CO—O-AL-
L2: -AL-CO—O-AL-O—
L3: -AL-CO—O-AL-O-AL-
L4: -AL-CO—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AR-O-AL-CO—
L17: —O—CO-AR-O-AL-O—CO—
L18: —O—CO-AR-O-AL-O-AL-O—CO—
L19: —O—CO-AR-O-AL-O-AL-O-AL-O—CO—
L20: —S-AL-
L21: —S-AL-O—
L22: —S-AL-O—CO—
L23: —S-AL-S-AL-
L24: —S-AR-AL—

Examples of the polymerizable groups (Q) in the formula (IV) are the same as those described in the polymer for orientation layer (Q1 to Q6).

In the formula (IV), n is an integer of 4 to 12, which is determined according to the chemical structure of the discotic core (D). The 4 to 12 combinations of L and Q can be different from each other. However, the combinations are preferably identical.

The optically anisotropic layer can be formed by coating an orientation layer with a coating solution containing the liquid crystal molecules and, if needed, a polymerization initiator and optional additives.

The optically anisotropic layer has a thickness preferably in the range of 0.5 to 100 µm, more preferably in the range of 0.5 to 30 µm.

After the optically anisotropic layer is formed, the multifunctional monomers are polymerized. If the polymer for orientation layer or the liquid crystal molecules have polymerizable groups, they are also polymerized with the multifunctional monomers.

The polymerization reaction can be classified into a thermal reaction with a thermal polymerization initiator and a photo reaction with a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and paminophenyl ketones (described in U.S. Pat. No. 3,549,367), acridine or phenazine compounds (described in Japanese Patent Provisional Publication No. 60 (1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with an ultraviolet ray.

The exposure energy is preferably in the range of 20 to 5,000 mJ per $cm^2$, and more preferably in the range of 100 to 800 mJ per $cm^2$. The light irradiation can be conducted while the layer is heated to accelerate the photo polymerization reaction.

A protective layer may be provided on the optically anisotropic layer.

[Polarizing Plate]

The polarizing plate comprises two transparent protective films and a polarizing membrane provided between the films. As the transparent protective film, a cellulose acetate film is generally used. As described above, the transparent support of the optical compensatory sheet can serve as one of the protective films. In that case, the optical compensatory sheet and the polarizing plate are usually combined to form an elliptically polarizing plate, in which the transparent axis of the polarizing plate is essentially parallel to the slow axis of the transparent support of the compensatory sheet.

The transparent protective film has a moisture permeability preferably in the range of 100 to 1,000 $(g/m^2)$/24 hours, more preferably in the range of 300 to 700 $(g/m^2)$/24 hours.

Examples of the polarizing membranes include an iodine polarizing membrane, a polyene polarizing membrane and a dichromatic dye polarizing membrane. The iodine polarizing membrane and the dye polarizing membrane are generally prepared from polyvinyl alcohol films.

[Liquid Crystal Display]

The optical compensatory sheet or the polarizing plate equipped with the optical compensatory sheet is preferably applied for a liquid crystal display (particularly, a display of transmission type).

A liquid crystal display of transmission type comprises two polarizing plates and a liquid crystal cell provided between them. The liquid crystal cell comprises a pair of electrode substrates and liquid crystal molecules placed between them.

In the case where the optical compensatory sheet of the invention is used in the display, one compensatory sheet is placed between the cell and one of the polarizing plates. Otherwise, two compensatory sheets are placed on both sides of the cell (i.e., each sheet is placed between the cell and each polarizing plate).

In the case where the polarizing plate of the invention is used in the display, the plate equipped with the compensatory sheet (according to the invention) is used in place of one or each of the two conventional polarizing plates. When the polarizing plate equipped with the compensatory sheet according to the invention is used, the plate is placed so that the compensatory sheet (which serves as a protective film) may be on the side of the liquid crystal cell.

Examples of preferred display modes of liquid crystal cell include TN mode, ECB mode, VA mode and OCB mode. The VA mode include MVA mode.

In a liquid crystal cell of TN mode, rod-like liquid crystal molecules are essentially horizontally oriented in twisted alignment with a twist angle of 60 to 120° when voltage is not applied. The liquid crystal cell of TN mode is widely used in color TFT liquid crystal displays, and hence is described in many publications.

In a liquid crystal cell of VA mode, rod-like liquid crystal molecules are essentially vertically aligned.

The liquid crystal cell of VA mode include some types:

(1) A liquid crystal cell of VA mode in a narrow sense (described in Japanese Patent Provisional Publication No. 2 (1990)-176625), in which rod-like liquid crystal molecules are essentially vertically aligned while voltage is not applied, and the molecules are essentially horizontally aligned while voltage is applied;

(2) A liquid crystal cell of MVA mode (described in SID97, Digest of tech. Papers, 28 (1997), 845), in which the VA mode is modified to be multi-domain type so as to enlarge the viewing angle;

(3) A liquid crystal cell of n-ASM mode (described in Nippon Ekisho Toronkai [Liquid crystal forum of Japan], Digest of tech. Papers (1998), 58–59), in which rod-like liquid crystal molecules are essentially vertically aligned while voltage is not applied, and the molecules are essentially oriented in twisted multi-domain alignment while voltage is applied;

(4) A liquid crystal cell of SURVAIVAL mode (published in LCD international 98); and (5) A liquid crystal cell of CPA mode (SID01).

The liquid crystal cell of OCB mode is a liquid crystal cell of bend alignment mode in which rod-like liquid crystal molecules in upper part and ones in lower part are essentially aligned in reverse (symmetrically). A liquid crystal display having the liquid crystal cell of bend alignment mode is disclosed in U.S. Pat. Nos. 4,583,825 and 5,410,422. Since rod-like liquid crystal molecules in upper part and ones in lower part are symmetrically aligned, the liquid crystal cell of bend alignment mode has self-optical compensatory function. Therefore, this mode is referred to as OCB (optically compensatory bend) mode. The liquid crystal display of bend alignment mode has an advantage of responding rapidly.

The liquid crystal cell of TN mode is widely used in color TFT liquid crystal displays, and hence is described in many publications.

The liquid crystal cell of ECB mode has been studied for long time, and hence is also described in many publications.

EXAMPLE 1

(Preparation of Cellulose Acetate Solution)

The following components were poured into a mixing tank, and stirred and heated to dissolve each component. Thus, a cellulose acetate solution was prepared.

| Cellulose acetate solution | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol (third solvent) | 11 weight parts |

(Preparation of Retardation Increasing Agent Solution)

16 Weight parts of the following retardation increasing agent, 80 weight parts of methylene chloride and 20 weight parts of methanol were poured into another mixing tank, and stirred and heated to prepare a retardation increasing agent solution.

(Retardation Increasing Agent)

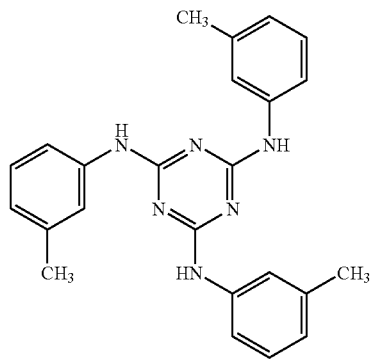

(Preparation of Transparent Support)

25 Weight parts of the prepared retardation increasing agent solution and 475 weight parts of the cellulose acetate solution were mixed and stirred to prepare a dope. The amount of the retardation increasing agent was 3.0 weight parts based on 100 weight parts of cellulose acetate.

The prepared dope was cast onto a cooled drum caster, so as to form a cellulose acetate film of transparent support.

The retardation values Re and Rth of the prepared cellulose acetate film were measured at the wavelength of 633 nm by means of an ellipsometer (M-150, Japan Spectrum Co., Ltd.), and found 10 nm and 81 nm, respectively.

(Formation of Undercoating Layer)

On the above-prepared cellulose acetate film, the following coating solution was applied in the amount of 28 ml/m², and dried to form a gelatin layer of 0.1 μm thickness.

| Coating solution for first undercoating layer | |
| --- | --- |
| Gelatin | 0.542 weight part |
| Formaldehyde | 0.135 weight part |
| Salicylic acid | 0.160 weight part |
| Acetone | 39.1 weight parts |
| Methanol | 15.8 weight parts |
| Methylene chloride | 40.6 weight parts |
| Water | 1.2 weight part |

(Formation of Second Undercoating Layer)

On the first undercoating layer, the following coating solution was applied in the amount of 7 ml/m², and dried to form a second undercoating layer.

| Coating solution for second undercoating layer | |
| --- | --- |
| The following anionic copolymer | 0.079 weight part |
| Monoethyl citrate | 1.01 weight part |
| Acetone | 20 weight parts |
| Methanol | 87.7 weight parts |
| Water | 4.05 weight parts |

(Anionic copolymer)

(Formation of Backing Layer)

On the reverse surface of the film, the following coating solution was applied in the amount of 25 ml/m², and dried to form a backing layer.

| Coating solution for backing layer | |
| --- | --- |
| Cellulose diacetate (acetic acid content: 55%) | 0.656 weight part |
| Silica matting agent (mean grain size: 1 μm) | 0.065 weight part |
| Acetone | 67.9 weight parts |
| Methanol | 10.4 weight parts |

(Formation of Orientation Layer)

A coating solution of the following composition was coated on the above-formed second undercoating layer by means of a wire bar coater of #16. The coating amount was 28 ml/m². The coated layer was dried with air at 60° C. for 60 seconds, and further air dried at 90° C. for 150 seconds. The dried layer was rubbed along the longitudinal direction of the cellulose acetate film (transparent support).

| Coating solution for orientation layer | |
| --- | --- |
| The following denatured polyvinyl alcohol | 8 weight parts |
| Non-denatured polyvinyl alcohol (PVA217, Kayaku Co., Ltd.) | 2 weight parts |
| Water | 361 weight parts |
| Methanol | 119 weight parts |
| Glutaric aldehyde (cross-linking agent) | 0.5 weight part |

(Denatured polyvinyl alcohol)

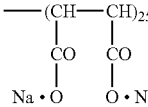

(Formation of Optically Anisotropic Layer)

To prepare a coating solution, 41.01 g of the following discotic liquid crystal compound, 2.03 g of ethylene oxide denatured trimethlolpropanetriacrylate (V#360, Osaka Organic Chemicals Co., Ltd.), 2.03 g of dipentaerythritolhexaacrylate (KYARD-DPHA, Nippon Kayaku Co., Ltd.), 0.90 g of cellulose acetate butyrate (CAB-551-0.2, Eastman Chemical), 0.23 g of cellulose acetate butyrate (CAB-551-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation layer by means of a wire bar coater of #4. The thus-treated film was fixed on a metal frame, and maintained in a thermostat at 130° C. for 2 minutes to align the molecules of the discotic compound. The film was then irradiated at 80° C. (the temperature of the film was 100° C.) for 0.4 second with an ultraviolet ray emitted from a high pressure mercury lamp of 120 W/cm, so as to polymerize the discotic liquid crystal molecules, the multi-functional monomer (dipentaerythritolhexaacrylate) and denatured polyvinyl alcohol (polymer for orientation layer). The film was cooled to room temperature. Thus, an optically anisotropic layer was formed to prepare an optical compensatory sheet.

The Re retardation value was measured at 633 nm, and found 48 nm. The average angle (inclined angle) between the discotic plane and the transparent support (cellulose acetate film) was 42°.

(Discotic Liquid Crystal Molecule)

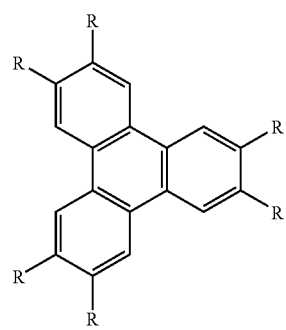

-continued

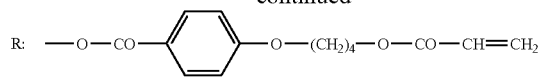

(Preparation of Polarizing Plate)

Iodine was adsorbed onto a stretched polyvinyl alcohol film to prepare a polarizing membrane.

The above-prepared optical compensatory sheet was laminated with a polyvinyl alcoholic adhesive onto one surface of the polarizing membrane, so that the backing layer of the transparent support in the sheet might be contact with the membrane. The slow axis of the transparent support was placed parallel to the transmitting axis of the polarizing membrane.

A commercially available cellulose triacetate film (Fujitac TD80UF, Fuji Photo Film Co., Ltd.) was saponified, and then laminated as a transparent protective film on the other surface (on the surface on which the optical compensatory sheet was not laminated) of the polarizing membrane. The slow axis of the transparent protective film was placed perpendicularly to the transmitting axis of the polarizing membrane.

Thus, a polarizing plate having the optical compensatory sheet was prepared.

(Test for Reworking)

The prepared polarizing plate (having the optical compensatory sheet) was laminated on a glass plate with an adhesive, so that the compensatory sheet side of the polarizing plate might be on the side of the glass plate.

The polarizing plate on the glass plate was aged for 6 hours at 50° C., 5 atm. After the aging was completed, the temperature and the relative humidity were set at 25° C. and 60%, respectively, and then the polarizing plate was peeled from the glass plate.

With respect to 100 of the polarizing plates, this procedure was performed. As a result, all the polarizing plates were clearly peeled off without breaking and leaving any fragment on the glass plate.

(Preparation of Liquid Crystal Display)

A pair of polarizing plates were removed from a commercially available liquid crystal display of TN mode (6E-A3, Sharp Corporation). In place of the removed polarizing plates, the above-prepared polarizing plate was laminated on each side of the liquid crystal cell with an adhesive, so that the compensatory sheet side of each polarizing plate might be on the side of the cell. The polarizing plate on the viewing side and that on the backlight side were placed so that the fast axes of the viewing side plate and the backlight side plate might be arranged in 0 mode.

Thus, the liquid crystal display was prepared.

The viewing angle of the prepared liquid crystal display was measured by means of a measuring apparatus (EZ-Contrast 160D, ELDIM) when each of eight tones of black (L1) to white (L8) was displayed. The viewing angle was defined as the angle range giving a contrast ratio of 10 or more without reversing black tones (between L1 and L2).

As a result, wide viewing angles were obtained. The upward, downward and leftward-rightward viewing angles were 70°, 45° and 160°, respectively.

EXAMPLE 2

(Preparation of Cellulose Acetate Solution)

Two cellulose acetate solutions (dopes for inner and outer layers) were prepared from the following compositions. The dope for inner layer was filtrated at 50° C. through a filter having absolute filtration precision of 0.01 mm [#63, Toyo Roshi Co., Ltd.], and that for outer layer was filtrated at 50° C. through a filter having absolute filtration precision of 0.0025 mm [FH025, Pole].

| Cellulose acetate solutions | Inner | Outer |
| --- | --- | --- |
| Cellulose acetate (acetic acid content: 60.5%) | 100 | 100 |
| Triphenyl phosphate | 7.8 | 7.8 |
| Biphenyldiphenyl phosphate | 3.9 | 3.9 |
| The retardation increasing agent used in Example 1 | 4.5 | 4.5 |
| Methylene chloride (first solvent) | 450 | 481 |
| Methanol (second solvent) | 39 | 42 |

(unit: weight part)

(Preparation of Transparent Support)

A three-layered casting die was used. The dopes for inner layer and for outer layer were simultaneously cast onto a metal support from the center nozzle and the outer nozzles, respectively. The amounts of the dopes were controlled so that the inner layer has the thickness of 45 μm and the outer layer has the thickness of 5 μm. The formed film was peeled off, and monoaxially (laterally) stretched by 30% by means of a tenter. The film was stepwise dried at 70° C. for 3 minutes, at 120° C. for 5 minutes, and 130° C. for 30 minutes. Thus, a cellulose acetate film for the transparent support was prepared. The amount of the solvent remaining in the film was 0.5 wt. %.

The retardation values Re and Rth of the prepared cellulose acetate film were measured at the wavelength of 633 nm by means of an ellipsometer (M-150, Japan Spectrum Co., Ltd.), and found 38 nm and 175 nm, respectively.

(Saponification of Transparent Support)

The transparent support was immersed in 2.0 N aqueous potassium hydroxide solution at 25° C. for 2 minutes, and then neutralized with sulfuric acid. After washed with pure water, the support was dried. The surface energy of the transparent support was measured by the contact angle method, and found 63 mN/m.

(Formation of Orientation Layer)

The coating solution for orientation layer used in Example 1 was coated on the saponified transparent support by means of a wire bar coater of #16. The coating amount was 28 ml/m². The coated layer was dried with air at 60° C. for 60 seconds, and further air dried at 90° C. for 150 seconds. The dried layer was rubbed at an angle of 45° to the longitudinal direction of the cellulose acetate film (transparent support).

(Formation of Optically Anisotropic Layer)

To prepare a coating solution, 41.01 g of the discotic liquid crystal compound used in Example 1, 1.22 g of ethylene oxide denatured trimethlolpropanetriacrylate (V#360, Osaka Organic Chemicals Co., Ltd.), 2.84 g of multi-functional monomers (NK ester/A-TMMT, Sin-Nakamura Kagaku Kogyo Co., Ltd.), 0.90 g of cellulose acetate butyrate (CAB-551-0.2, Eastman Chemical), 0.23 g of cellulose acetate butyrate (CAB-551-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation layer by means of a wire bar coater of #4. The thus-treated film was fixed on a metal frame, and maintained in a thermostat at 130° C. for 2 minutes to align the molecules of the discotic compound. The film was then irradiated at 80° C. (the temperature of the film was about 100° C.) for 0.4 second with an ultraviolet ray emitted from a high pressure mercury lamp of 120 W/cm, so as to polymerize the discotic liquid crystal molecules, the multi-functional monomer and denatured polyvinyl alcohol (polymer for orientation layer). The film was cooled to room temperature. Thus, an optically anisotropic layer was formed to prepare an optical compensatory sheet.

The Re retardation value was measured at 633 nm, and found 45 nm. The average angle (inclined angle) between the discotic plane and the transparent support (cellulose acetate film) was 39°.

(Preparation of Polarizing Plate)

The procedure in Example 1 was repeated except that above-prepared optical compensatory sheet was laminated so that the slow axis of the transparent support might be at an angle of 45° to the transmitting axis of the polarizing membrane. Thus, a polarizing plate was prepared.

(Test for Reworking)

The prepared polarizing plate (having the optical compensatory sheet) was laminated on a glass plate with an adhesive, so that the compensatory sheet side of the polarizing plate might be on the side of the glass plate.

The polarizing plate on the glass plate was aged for 6 hours at 50° C., 5 atm. After the aging was completed, the temperature and the relative humidity were set at 25° C. and 60%, respectively, and then the polarizing plate was peeled from the glass plate.

With respect to 100 of the polarizing plates, this procedure was performed. As a result, all the polarizing plates were clearly peeled off without breaking and leaving any fragment on the glass plate.

(Preparation of Liquid Crystal Cell of Bend Alignment)

On a glass plate having an ITO electrode, an orientation layer of polyimide was provided and subjected to a rubbing treatment. This procedure was repeated to prepare two substrates, and the substrates were arranged face-to-face so that the rubbing directions might be parallel and that the cell gap might be 6 μm. Between them, a liquid crystal having Δn of 0.1396 (ZLI1132, Merck & Co., Inc.) was introduced to prepare a liquid crystal cell of bend alignment.

(Preparation of Liquid Crystal Display)

Two polarizing plates prepared above were laminated on the liquid crystal cell of bend alignment so that the cell might be between the plates. The plates were arranged so that the optically anisotropic layer in each plate might face to the cell substrate and that the rubbing directions of the cell and the optically anisotropic layer might be reversely parallel.

Voltage of a square wave (55 Hz) was applied to the liquid crystal cell. An image was displayed according to normally white mode (white: 2V, black: 5V). A ratio of the transmittance (white/black) was measured as a contrast ratio. The upward, downward, and leftward-rightward contrast ratios were measured by means of a meter (EZ-Contrast 160D, ELDIM), and the viewing angle giving a contrast ratio of not smaller than 10 (without tone inversion in black displaying) was measured at eight displaying states of L1 (full black) to L8 (full white).

As a result, wide viewing angles were obtained. The upward, downward and leftward-rightward viewing angles were 80°, 80° and 80°, respectively.

EXAMPLE 3

(Preparation of Cellulose Acetate Solution)

A cellulose acetate solution (dope) of the following components was prepared.

| Cellulose acetate solution | |
|---|---|
| Cellulose acetate (acetic acid content: 59.5%) | 100 weight parts |
| Triphenyl phosphate | 7.8 weight parts |
| Biphenyldiphenyl phosphate | 3.9 weight parts |
| The retardation increasing agent used in Example 1 | 2.0 weight parts |
| Methylene acetate | 306 weight parts |
| Cyclohexanone | 122 weight parts |
| Methanol | 30.5 weight parts |
| Ethanol | 30.5 weight parts |
| Silica fine particles (mean grain size: 20 nm) | 1.0 weight part |

(Preparation of Transparent Support)

The prepared dope was cast onto a metal support, and dried at 70° C. for 3 minutes and at 120° C. for 5 minutes. The formed film was peeled from the support, and then further dried at 130° C. for 50 minutes to form a cellulose acetate film of transparent support. The amount of remaining solvent was 0.8 wt. %.

The retardation values Re and Rth of the prepared cellulose acetate film were measured at the wavelength of 633 nm by means of an ellipsometer (M-150, Japan Spectrum Co., Ltd.), and found 10 nm and 50 nm, respectively.

(Saponification of Transparent Support)

The transparent support was coated with 2.0 N aqueous potassium hydroxide solution at 70° C. for 30 seconds. After washed with pure water, the support was dried. The surface energy of the transparent support was measured by the contact angle method, and found 65 mN/m.

(Formation of Orientation Layer and Optically Anisotropic) Layer

The procedures of Example 3 were repeated except that the undercoating layer was not provided, to form an orientation layer and an optically anisotropic layer on the saponified surface of the transparent support. Thus, an optical compensatory sheet was produced.

EXAMPLE 4

(Saponification of Transparent Support)

The transparent support prepared in Example 1 was coated with 1.5 N potassium hydroxide solution (solvent: water/isopropyl alcohol/polyethylene glycol=14/86/15) in the amount of 5 ml/m² at 60° C. for 10 seconds. After remaining potassium hydroxide was removed by washing, the support was dried. The surface energy of the transparent support was measured by the contact angle method, and found 63 mN/m.

(Formation of Orientation Layer and Optically Anisotropic) layer

The procedures of Example 1 were repeated except that the undercoating layer was not provided, to form an orientation layer and an optically anisotropic layer on the saponified surface of the transparent support. Thus, an optical compensatory sheet was produced.

(Test for Reworking)

The procedure in Example 1 was repeated, and thus, a polarizing plate was prepared.

The prepared polarizing plate (having the optical compensatory sheet) was laminated on a glass plate with an adhesive, so that the compensatory sheet side of the polarizing plate might be on the side of the glass plate.

The polarizing plate on the glass plate was aged for 6 hours at 50° C., 5 atm. After the aging was completed, the temperature and the relative humidity were set at 25° C. and 60%, respectively, and then the polarizing plate was peeled from the glass plate.

With respect to 100 of the polarizing plates, this procedure was performed. As a result, all the polarizing plates were clearly peeled off without breaking and leaving any fragment on the glass plate.

I claim:

1. An optical compensatory sheet comprising a transparent support and an optically anisotropic layer, wherein the optically anisotropic layer is formed from liquid crystal molecules and monomers having four or more double bonds, wherein said monomers are polymerized to form a crosslinked polymer in the optically anisotropic layer, wherein the transparent support has a retardation value in plane in the range of 0 to 50 nm and a retardation value along a thickness direction in the range of 70 to 400 nm, wherein the transparent support is a cellulose acetate film comprising cellulose acetate having an acetic acid content in the range of 59.0 to 61.5% and wherein the cellulose acetate film contains an aromatic compound having two or more aromatic rings in an amount of 0.01 to 20 weight parts based on 100 weight parts of cellulose acetate.

2. The optical compensatory sheet as defined in claim 1, wherein the cellulose acetate film is formed by casting two or more cellulose acetate solutions simultaneously.

3. The optical compensatory sheet as defined in claim 1, wherein the cellulose acetate film is formed from a solution of cellulose acetate in a solvent selected from the group consisting of an ether having 2 to 12 carbon atoms, a ketone having 3 to 12 carbon atoms and an ester having 2 to 12 carbon atoms.

* * * * *